Dec. 28, 1937.   G. J. DAY   2,103,614
THERMOSTATIC VALVE
Filed Jan. 6, 1934    6 Sheets-Sheet 1

INVENTOR
GEORGE J. DAY.
BY O. V. Thiel
ATTORNEY

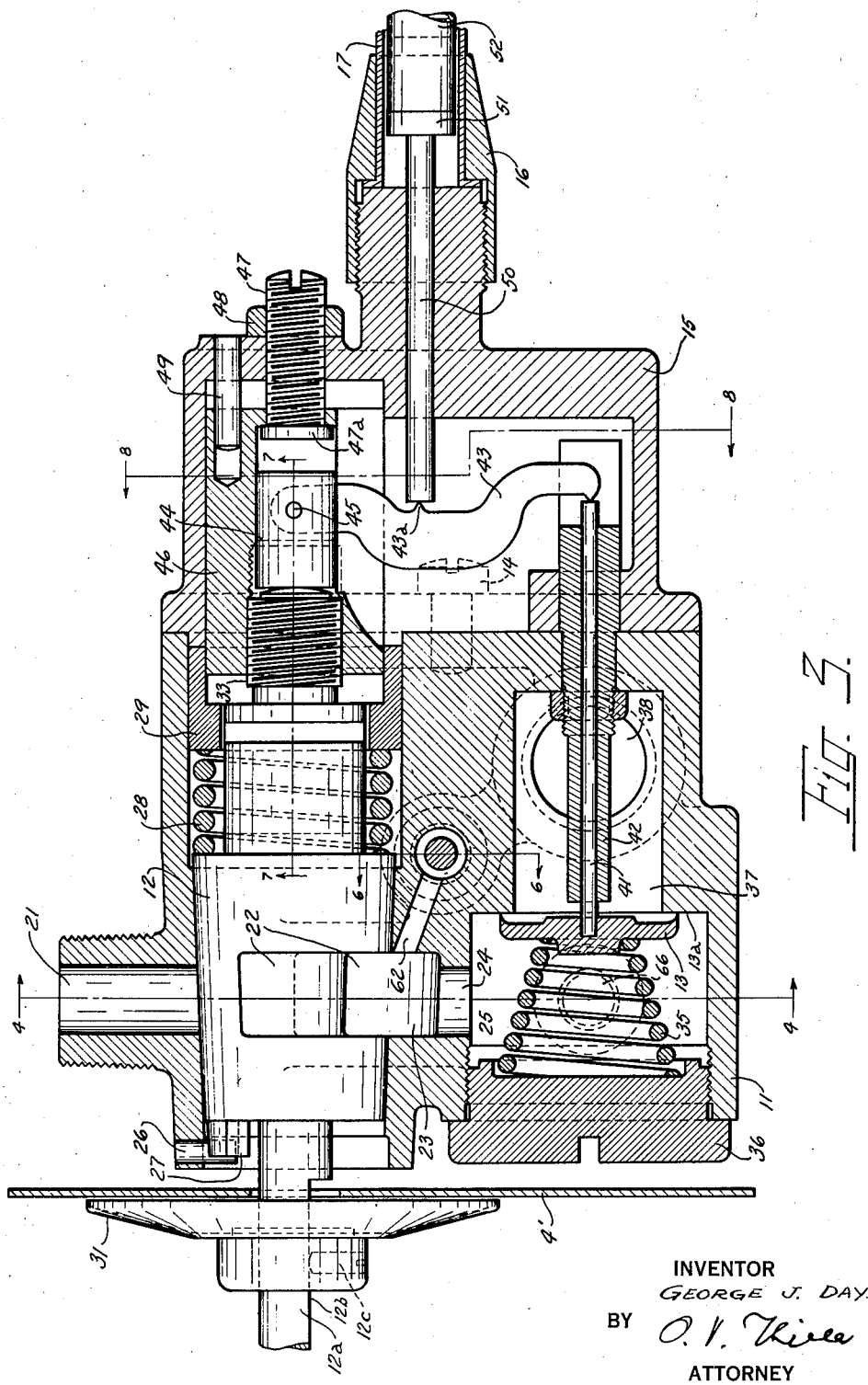

Dec. 28, 1937.  G. J. DAY  2,103,614
THERMOSTATIC VALVE
Filed Jan. 6, 1934  6 Sheets-Sheet 3
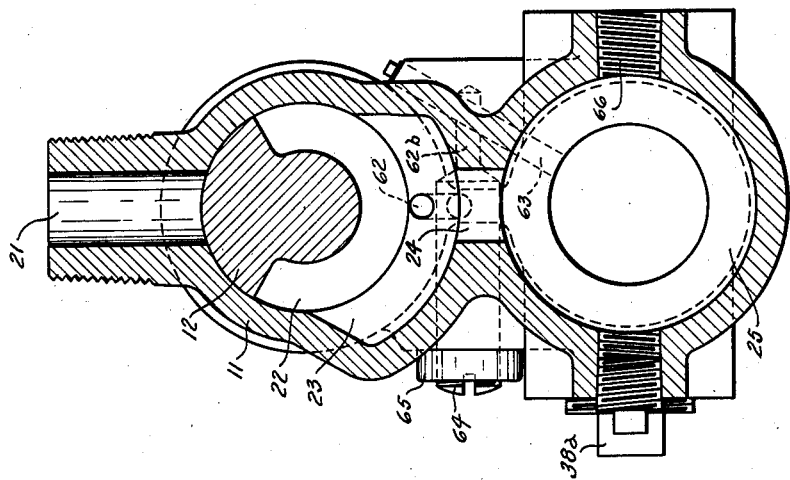
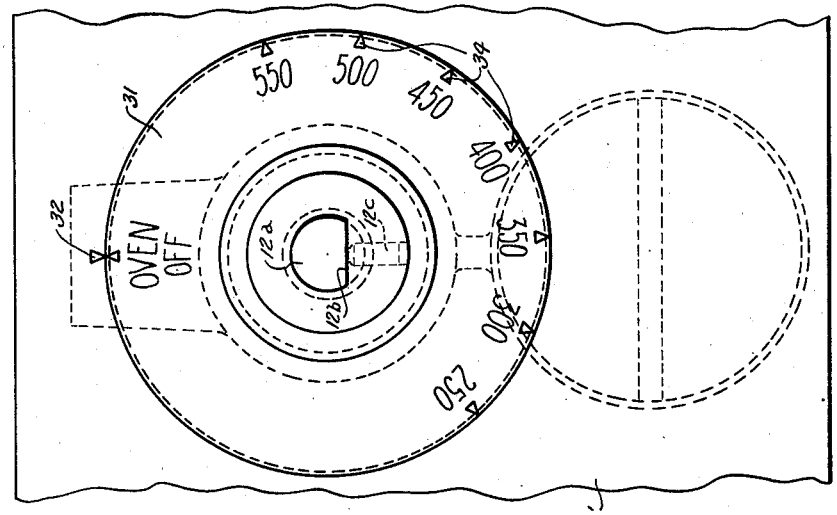
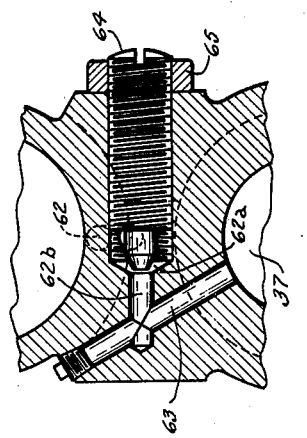
INVENTOR
GEORGE J. DAY.
BY *O. V. Thiele*
ATTORNEY Dec. 28, 1937.  G. J. DAY  2,103,614
THERMOSTATIC VALVE
Filed Jan. 6, 1934  6 Sheets-Sheet 4
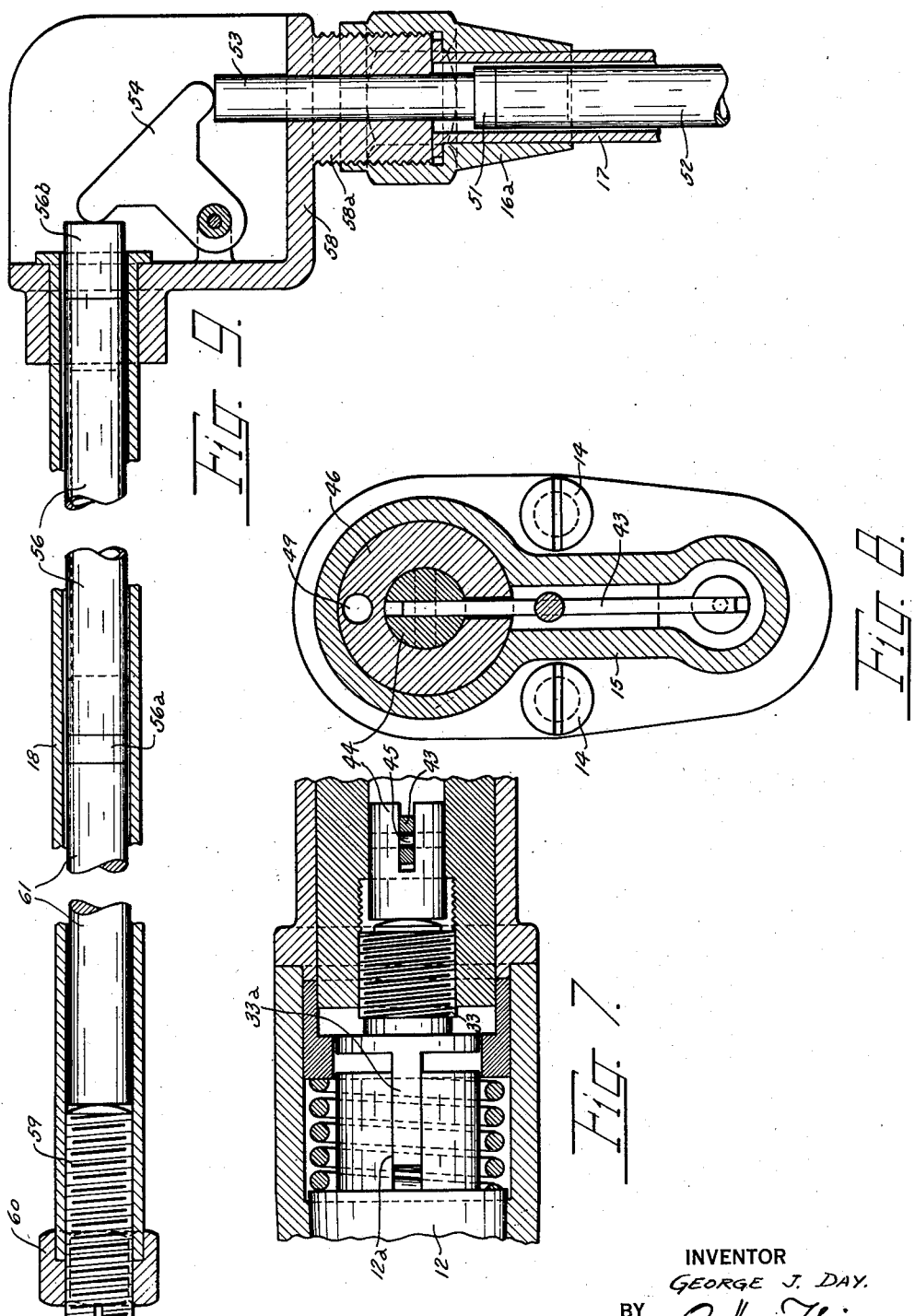

Dec. 28, 1937.　　　　　G. J. DAY　　　　　2,103,614
THERMOSTATIC VALVE
Filed Jan. 6, 1934　　　　6 Sheets—Sheet 5
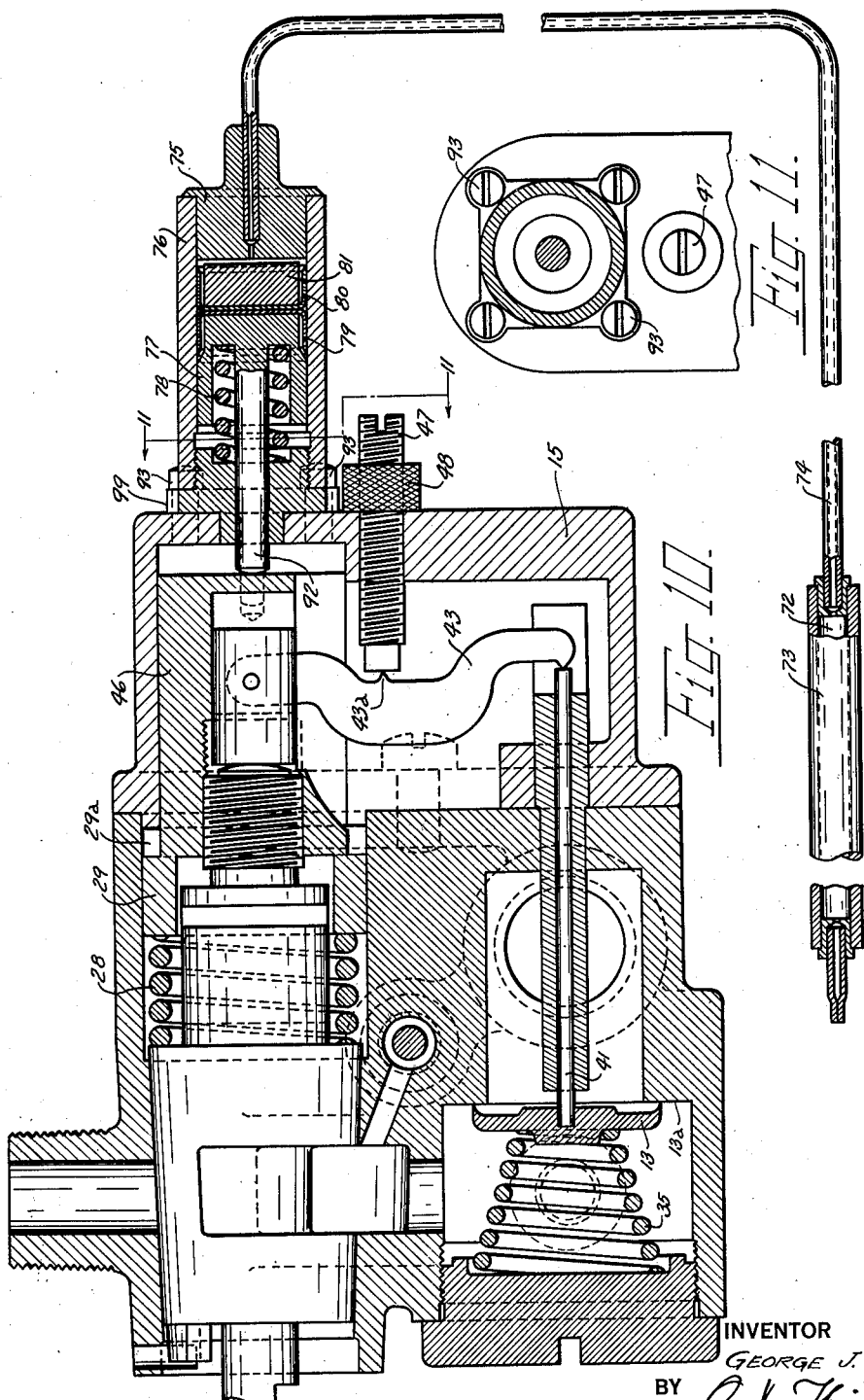
INVENTOR
GEORGE J. DAY.
BY
ATTORNEY

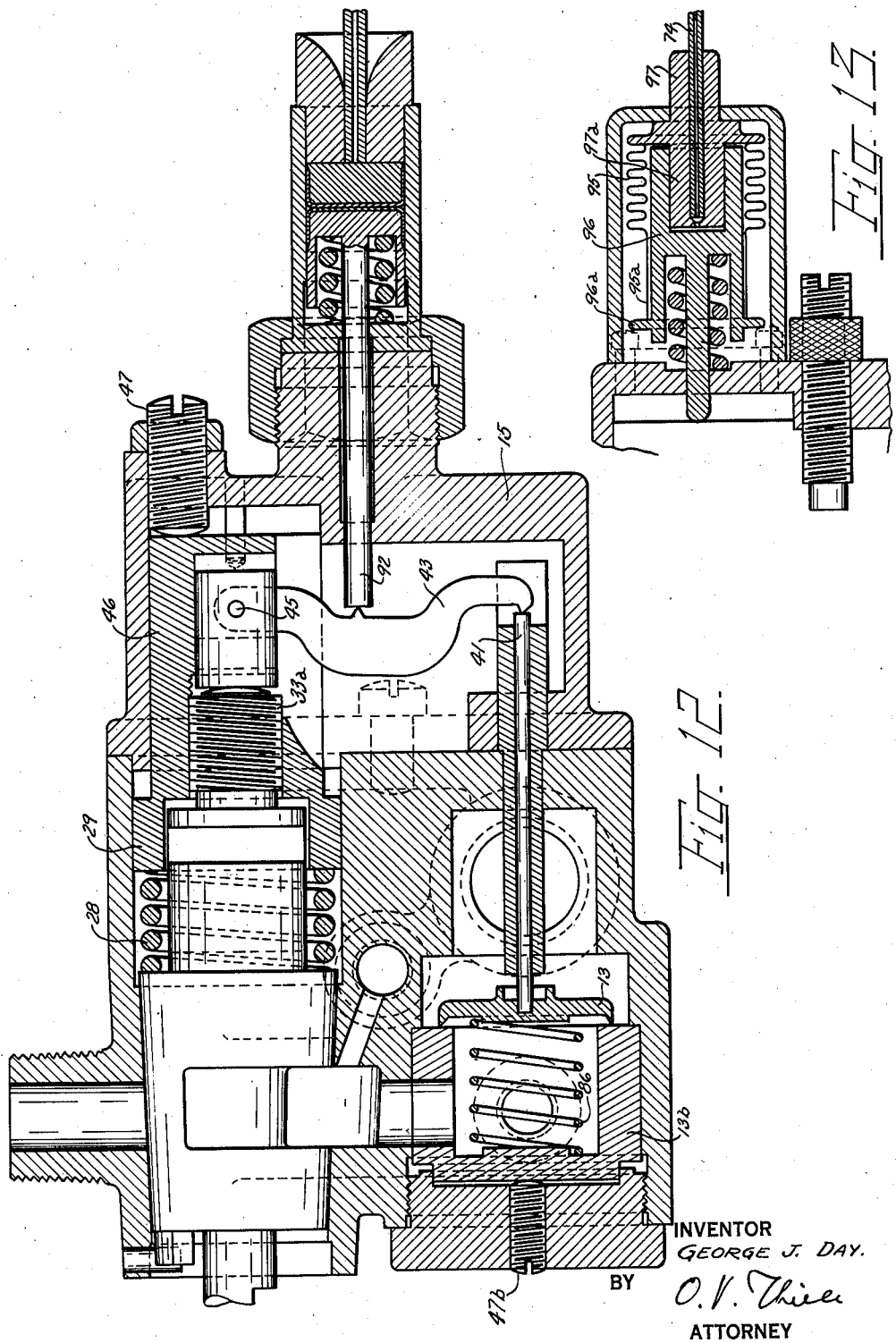

Patented Dec. 28, 1937

2,103,614

UNITED STATES PATENT OFFICE 2,103,614

THERMOSTATIC VALVE

George J. Day, Buffalo, N. Y.

Application January 6, 1934, Serial No. 705,536

24 Claims. (Cl. 236—15)

This invention relates to valve structures intended primarily for controlling the flow of the gas supply to the oven burners of a modern domestic gas range, particularly those of the table top and console types of bungalows and cookers. It has for its object the provision of an improved valve structure of this type. The features of the improved structure will largely be apparent from a reading of the following specification, and the most important ones will be found enumerated toward the end of the specification at which point they will be more readily understood.

Figure 1:
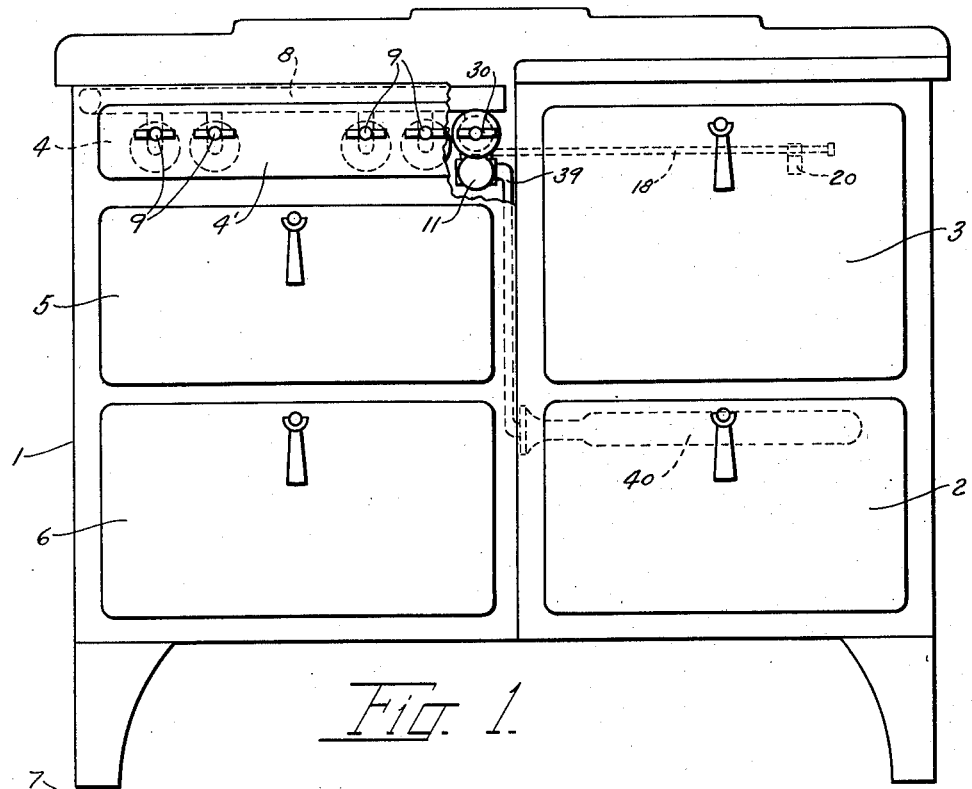
Figure 2:
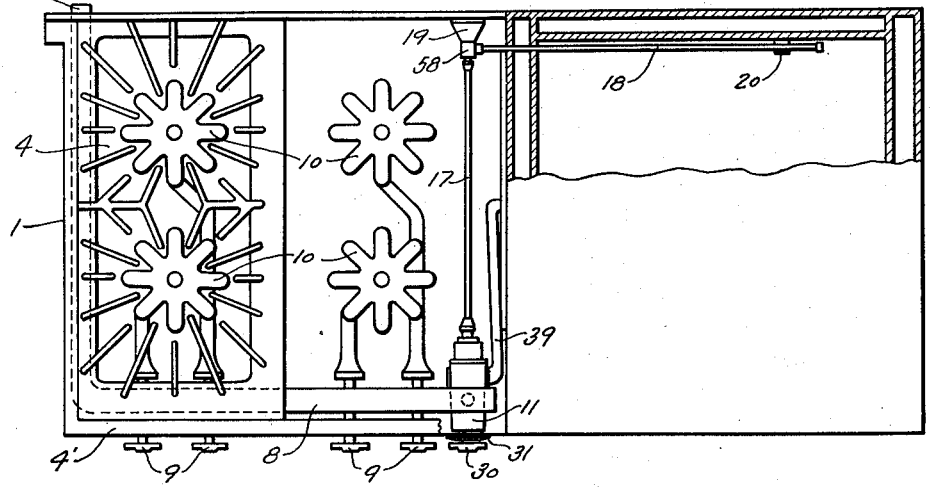

The invention is illustrated in the drawings accompanying this specification. In these drawings Fig. 1 shows a front view of a modern gas stove with my invention applied; Fig. 2 shows a plan view of the same; Fig. 3 shows a longitudinal vertical section of my improved valve structure; Figs. 4, 6, 7 and 8 are sections respectively on lines 4—4, 6—6, 7—7 and 8—8 of Fig. 3. Fig. 5 is a front view of a portion of the manifold cover of a gas stove equipped with my improved valve structure; Fig. 9 is a section, viewed from below, of the thermostatic element used in connection with the invention; Fig. 10 is a view similar to that of Fig. 3 showing a variation in the valve structure and also including a different type of thermostatic element; Fig. 11 is a section on line 11—11 of Fig. 10; Fig. 12 is a sectional view similar to that of Fig. 3 showing a further variation and Fig. 13 is a fragmentary sectional view showing a modified detail of the thermostat used in the forms illustrated in Figs. 10 and 12.

Referring first to Figs. 1 and 2, 1 indicates a gas stove of the table top type which is composed of a broiler section 2, an oven section 3, an open burner section 4 and the compartments 5 and 6 for utensils.

Open burner section 4 is provided with a cover 4' which is provided with openings through which extend the stems for the fuel supply valves for the open burners as well as the stem for the fuel supply valve for the oven burner. A fuel supply pipe 7 enters the open burner section 4 and connects at the front thereof with the manifold 8 to which are connected the valves 9—9 which control the gas supply to the open burners 10—10 of the open burner section. To this manifold there is also connected in a manner similar to that in which the valves 9 are connected a casing 11 within which is located my improved valve structure.

Referring now more particularly to Fig. 3 and the sectional views based on it, casing 11 accommodates the manually operated valve plug 12 controlling the fuel supply, and the thermostatic valve 13 regulating it. To the casing 11 is connected by means of the screws 14—14 the movement housing 15 which contains the mechanism for adjusting the temperature at which the thermostat becomes operative as well as the mechanism for the ordinary operation of setting the thermostatic valve for any desired oven temperature.

To the movement housing 15 is attached by means of the coupling nut 16 the tube 17 which in turn is connected by coupling nut 16a to the L-shaped casing 58 which carries the bell crank 54. To the L-shaped casing 58 is attached the thermostatic expansion and contraction tube 18. The thermostat will be described a little more fully below. Tube 18 is placed in the oven in the most convenient or preferred position and conveniently supported by bracket 20. The L-shaped casing 58 is supported in the open burner section 4 by bracket 19.

The casing 11 is provided with a fuel inlet port 21 which is in alinement with a groove 22 in the fuel supply valve plug 12. A groove 23 of the same width as groove 22 in the fuel supply valve plug 12 is also provided in the casing 11 in such a location that with the valve rotated into the proper position, the two grooves form a single continuous passage for the fuel supply to the oven, these two grooves being of such length that they remain in open communication with each other over the entire range of oven burner operation. A fuel inlet port 24 connects groove 23 and inlet chamber 25, this port 24 being, for convenience of manufacture, alined with the fuel inlet port 21.

Casing 11 is provided with a stop 26 which coacts with a stop 27 on the fuel supply valve plug 12 to limit the rotation of such plug to less than one complete revolution.

Fuel supply valve plug 12 is conical in shape tapering away from the movement housing 15 and is held on its seat to form a gas tight connection with the casing 11 by means of the plug spring 28 which abuts against the annular spring support 29 held in place by the movement housing 15.

The fuel supply valve plug 12 is provided at its outer end with a stem 12a on which a handle 30 and a dial 31 are fixed in any manner such that no rotary displacement of the two relative to each other can occur. The specific means to accomplish this shown in the illustrated form is a flattened spot on the otherwise cylindrical stem, the handle and dial having corresponding flat spots in their otherwise cylindrical bores and being held on the handle by set screws. The flat spot on the stem shows clearly at 12b in Figs. 3 and 5, and the set screw of the dial appears at 12c. Dial 31 coacts with the pointer 32 on the manifold cover 4' as described more fully below. At its inner end valve plug 12 is slotted as is shown clearly at 12a, Fig. 7. Into this slot 12a fits a complementary flat portion 33a of the thermostatic valve adjustment screw 33. Rotation of the handle 30 will cause an equal rotation of dial 31, fuel supply valve plug 12 and thermostatic valve adjustment screw 33. Dial 31 carries a graduated scale marked with radial lines and numerals 34—34 extending over the required temperature range of the oven. As will be understood from what is said below, the radial lines and numerals are so arranged that when a line 34 is in register with pointer 32, the oven temperature will be that indicated for such line.

The thermostatic valve 13 seats against shoulder or seat 13a of the casing 11 and is constantly urged by valve spring 35 towards its closed position. Spring 35 is held in position by case cover 36. When the movement of the thermostatic valve towards the closed position is not resisted by the thermostat, spring 35 will close the valve and thereby prevent fuel from inlet chamber 25 from reaching outlet chamber 37. For convenience in mounting, outlet chamber 37 is provided with two outlet ports 38 on opposite sides and a fuel supply pipe 39 which conveys the fuel to the oven burner 40 may be connected to the more convenient of the two the other being closed with a solid plug. In the case illustrated plug 38a appears on the left side in Fig. 4, the fuel pipe for the oven being connected on the opposite side.

The thermostatic valve 13 is actuated in the opening direction by a gland pin 41 which is guided in its movement by gland pin guide 42. The end of the pin 41 opposite valve 13 contacts with the free end of lever 43. While the gland pin 41 is free to move longitudinally within the gland pin guide 42 the fit between the two is such as to form a gas seal between the outlet chamber 37 and the chamber in which lever 43 is located. This construction frees the thermostat, the thermostat adjusting mechanism and the thermostatic valve operating mechanism from contact with fuel gases, which is practically an essential requirement.

The end of lever 43 opposite to the one contacting with pin 41 is pivoted in pivot plug 44 by means of the pivot pin 45. Pivot plug 44 is mounted slidably in thermostatic adjustment plug 46 and its forward end engages thermostatic valve adjustment screw 33 when the thermostat is acting upon thermostatic valve 13. Thermostatic adjustment plug 46 and pivot plug 44 are co-axial with fuel supply valve plug 12.

Thermostatic valve screw 33 is threaded and engages complementary threads in the outer portion of thermostatic adjustment plug 46, its inner spherical end engaging the end of pivot plug 44 when the thermostat is forcing or is about to force thermostatic valve 13 off its seat. The thread is such that a rotation of the handle 30 in a direction to indicate a higher temperature on dial 31 moves the screw inward. Thermostat adjustment plug 46 is movable along its axis but is kept from rotating by key pin 49 secured in the movement housing 15. Thermostatic adjustment screw 47, whose head 47a engages the interior shoulder of adjustment plug 46, limits the forward motion of the plug the plug being resiliently forced in a forward direction by spring 35 acting through pin 41, lever 43, pivot plug 44 and screw 33.

The thermostat itself is of the known rod-and-tube type. It extends to the outside of the oven, its outer end being secured to the L-shaped casing 58 and its inner end being closed by means of a thermostatic adjusting screw 59 held in place by the lock nut 60. Enclosed within the tube part of the tube lying inside of the oven is the carbon rod 61, one end of which abuts against the thermostatic adjusting screw 59, the other end engaging the tip 56a of rod 56, the opposite end of which extends into the casing 58, its tip 56b engaging one arm of the bell crank 54. This bell crank is pivoted at its base within the casing 58, its other arm engaging the end of pin 53 which is slidably mounted in the portion 58a of casing 58 to which tube 17 is connected. Interposed between pins 53 and 50 and lying within the tube 17 is rod 52 with tips 51—51. The forward end of pin 50 engages contact point 43a of lever 43, this point being located between the pivoted and free ends of the lever, thereby completing the actuating train between thermostat 18 and thermostatic valve 13.

Casing 11 is supplied with the usual adjustable by-pass for maintaining a constant burner flame when the thermostatic valve 13 is closed. This by-pass comprises passage 62, chamber 62a, passage 62b, and passage 63, the first of these passages opening from groove 23, and the last opening into thermostatic valve outlet chamber 37. By-pass screw 64, held in position by nut 65 after adjustment, regulates the rate of flow of gas to maintain the constant burner flame.

Casing 11 is equipped with openings 66 for screw threaded attachment of the pilot T and tube for maintaining the usual pilot flame in the oven. An opening 66 is provided at each side and the more convenient one of the two used, the other being closed by a plug.

From the above description the following statement of the action of the device will be readily understood.

Assuming that the oven is at room temperature, thermostatic tube 18 will be in its contracted state and thermostatic valve 13 will be unseated by spring 28, and will allow the fuel to flow from the manifold through the opening between the thermostatic valve 13 and its seat 13a to the burner 40. The valve will at this time have the maximum opening determined by the setting of dial 31. When the burner has been lighted and the oven is heated, the thermostatic tube 18 will be expanded thereby increasing its length. The length of the carbon rod 61 is little affected by the heat and will therefore by differential expansion as compared with tube 18 permit valve spring 35 to close or move toward a closed position the thermostatic valve 13. The pressure of the spring will at the same time prevent any lost motion in the elements extending from it to screw 59, i. e., gland pin 41, lever 43, pin 50, rod 52 with its tips 51, bell crank 54, and rod 56 with its tips 54 and 57. The thermostat having been previously adjusted so that the radial line and number 34 on the dial 31 indicating the desired oven temperature are in register with pointer 32 on the manifold 4', the thermostat will have permitted the valve to close to a point where sufficient gas will be allowed to pass the thermostatic valve to hold the oven at the predetermined temperature indicated by the dial setting. Any variation in oven temperature above or below the predetermined temperature indicated by the setting of dial 31 will cause an expansion or contraction of thermostatic tube 18 with such corresponding movement of the thermostatic valve 13 as to regulate the flow of fuel to the burner 40 to maintain a constant temperature at the center of the oven.

If now it is desired to raise the oven temperature, a turn of the handle 30 in a clockwise direction to indicate the higher temperature on dial 31 will cause thermostatic valve adjustment screw 33 to move inward, its flat portion 33a sliding in slot 12a of valve plug 12, and will move pivot plug 44 inward with it, thereby opening thermostatic valve 13 farther. This new position of valve 13 will not be permanent. As soon as the temperature of the oven and thermostat rise, the thermostat will act to retract rod 50 a little, or more accurately, to permit spring 35 to push it back and partly to close valve 13. The ultimate position of the valve will be such that the oven temperature will again correspond to that indicated by the setting of dial 31.

If a lower temperature is desired, the reverse movement of handle 30 will move screw 33 outward, thereby allowing spring 35 to move valve 13 in a closing direction. As the oven and thermostat cool, the thermostat will give valve 13 the setting to result in the temperature corresponding to the dial setting.

The above assumes that the device has been properly adjusted. The adjusting will next be described. The instrument is so assembled in the first place that thermostatic adjustment plug 46 is held by thermostat adjustment screw 47 in such position that thermostat adjustment plug 46 has substantially equal adjustment in both directions along its axis.

The first step is to adjust the thermostat to a point where it becomes operative at room temperature. To do this handle 30 is rotated until the radial line on dial 31 indicating room temperature, which will be the temperature of the thermostat tube 18, is in register with indicator 32 on the manifold cover 4'. The thermostatic adjusting screw 59 is then adjusted until thermostatic valve 13 is just on the point of opening. Lock nut 60 is thereupon tightened, locking thermostat adjusting screw 59 in place. This adjustment is made in the factory and before the device is installed.

When the instrument has been installed on the range, it is impractical to adjust to the higher temperatures with thermostat adjusting screw 59. For one thing, the oven temperature will be too high to allow the hand to be inserted into the oven and furthermore, opening the oven door will change the oven temperature before adjustment can be made. For such further adjustment, thermostat adjustment screw 47 is used, this screw being accessible for this purpose in the open burner section 4.

To make the adjustment, some temperature is selected and the handle 30 is rotated until the radial line on dial 31 indicating such temperature registers with pointer 32 on manifold cover 4'. The thermostat adjustment screw 47 is then turned until the temperature at the center of the empty oven corresponds to the temperature shown on dial 31, whereupon adjustment screw 47 is locked in position by lock nut 48. With a properly calibrated dial 31, settings at any other temperatures within the dial range will then produce corresponding temperature in the center of the oven.

Referring next to the variation of Figs. 10 and 11, it will be noted that the valve structure differs somewhat from that of the form first described. For one thing, the thermostatic adjustment screw 47, instead of acting on the thermostatic adjustment plug 46 acts on contact point 43a of the lever 43, the thermostatic element acting on the the thermostatic adjustment plug. The reason for this change in the construction is coupled with the different type of thermostatic element here employed. I shall therefore first describe this thermostatic element. It is of the liquid and bulb type. The bulb 73 contains a liquid 72 which also fills capillary tube 74, cylinder plug 75 and plunger cylinder 76, the latter containing plunger 77, plunger spring 78, follower cups 79 and 80 and follower cup plug 81. Plunger 77 comprises a pin 92 extending slidably through flange 99 and contacting with the end of thermostat adjustment plug 46. Flange 99 is in screw threaded connection with plunger cylinder 76 and is attached to movement housing 15 by means of screws 93, 93. Capillary tube 74 is welded at one end to bulb 73 and at the other end to cylinder plug 75, which in turn is welded to plunger cylinder 76 thereby making a hermetically sealed assembly. The bulb 73 is supported on the liners of the oven section by any preferred means, such as brackets.

The liquid and bulb thermostat assembly must be so constructed that the expansion fluid is hermetically enclosed and will continue so for the life of the thermostat. The construction above described accomplishes this result. The requisite tight fit between follower cups 79 and 80 and the cylinder 76 is obtained by tapering the cups with the large diameter at their open ends. When these follower cups are forced into the plunger cylinder, they exert a constant pressure against the inside of the cylinder. When the assembly of bulb 73, capillary tube 74 and plunger cylinder 76 has been filled with liquid 72 and before sealing the assembly, sufficient pressure is applied to compress plunger spring 78 slightly. The end of bulb 73 is then sealed. The liquid exerts pressure equally in all directions; therefore the pressure between the outside of the follower cup 80 and the inside of the plunger cylinder 76 is always equal to the pressure of the liquid plus the initial pressure due to the difference in diameters of outside of follower cup and inside of plunger cylinder. Therefore the liquid cannot pass between the outside of the follower cup and the inside of the plunger cylinder. In like manner should the liquid congeal and tend to form a vacuum in the thermostat assembly, follower cup 79 will exert a pressure against the inside of plunger cylinder wall equal to atmospheric pressure plus the initial pressure due to difference in diameter of follower cup and plunger cylinder. Preferably enough liquid is used in the assembly to prevent follower cup plug 81 from striking cylinder plug 75 when the liquid is at the lowest temperature to which it is apt to be exposed. This will avoid any tendency of forming a vacuum in the assembly.

Follower cups 79 and 80 must be made of materials with the same coefficient of expansion as plunger cylinder 76 to insure constant pressure between the outside of the follower cup and the inside of the plunger cylinder.

The liquid having a high coefficient of expansion as compared with that of the follower cups and plunger cylinder will, unless this is compensated for, cause the follower cups and the parts associated with them to move with variations in temperature at the point outside of the oven where these parts are located, thereby correspondingly affecting the oven temperature. The means for effecting this compensation are as follows. A follower cup plug 81 is provided, fitting loosely on the inside of the follower cup 80, displacing its volume of liquid 72 in the plunger cylinder. This follower cup plug 81 is made of a material with such a low coefficient of expansion that it substantially compensates for the excess in change in volume of the liquid over the change in volume of the portion of the plunger cylinder which contains it. The coefficient of expansion required can readily be calculated, and a suitable alloy selected. Should further compensation be required than is convenient to secure with the follower cup plug 81 only, such additional compensation can be obtained by making pins 92 and 41 of material of low expansivity.

Thermostatic adjustment plug 46 in this form of my device carries and is preferably unitary with the spring support 29, some clearance 29a being provided at the inner end of the ring.

It is necessary in a liquid and bulb type thermostat to provide against the thermostat destroying itself when the bulb is overheated or when the manually operating means for the thermostatic valve is turned from a high to a low temperature setting, and this is done in my device. Should the bulb 73 be heated to an excessive temperature, thermostatic valve 13 will first be moved against seat 13a by spring 35. The pivoted end of lever 43 will then continue to move thermostatic adjustment plug 46 against plug spring 28 and spring 78 creating within the thermostatic assembly an increased unit pressure. This pressure however will simply be that created by the tension of the springs and will not injure the thermostat. The same sort of action occurs when the manual adjusting means for the thermostatic valve is turned from a high to a low temperature.

The reason for interchanging the contact points of the actuating part of the thermostatic element and the end of the thermostatic adjustment screw 47 as compared with their relative positions in the form first described will now be readily understood. With a rise in temperature the liquid in the thermostat expands, and arranging the points as shown results in a closing movement of thermostatic valve 13 with such temperature increase.

The operation of this form differs in no essential point from that of the form first described, and calls for no further description. The adjustments, too, are made in the same way, except that the setting of the valve for room temperature is also made by means of screw 47.

A further variation is illustrated in Fig. 12, which also uses a liquid-and-bulb type of thermostat. It will be noted from an inspection of the figure that in some respects the valve structure differs from those of the two forms first described. The arrangement of the lever 43 with regard to its fulcrum and the points where pins 41 and 92 engage it is the same as that in the construction according to Fig. 3. It will be noted, however, that the direction in which thermostatic valve 13 opens is opposite from that of the two first forms and that the thread on thermostatic valve adjustment screw 33a is the reverse of that of Figs. 3 and 10. This obviously is an equivalent arrangement. The thermostatic element is the same as that of the form shown in Fig. 10. The change in direction of opening of valve 13 obviously results in the same reaction to temperature changes in the oven as far as valve 13 is concerned as are obtained in the form of Fig. 10. Thus if the temperature in the oven is lower than called for by the setting of the dial 31, the liquid in the thermostat will be of such contracted volume as to permit spring 86 acting on valve 13 to open it further thereby supplying more fuel and allowing the temperature to rise. If the dial should be changed to a lower temperature setting, pivot pin 45 will be moved to the right, as viewed in Fig. 12, thereby partially closing thermostatic valve 13. As the liquid in the thermostat cools to the new temperature, spring 86 will again partly open valve 13, this final position being the one corresponding to the setting of the dial. The action when the setting is changed to a higher dial reading will be clear.

In Fig. 13 is illustrated a modified construction for hermetically sealing the thermostat at the valve end. This variation utilizes a bellows and is shown as applied to the form of the invention shown in Fig. 10. The capillary tube 74 is welded at one end to the bulb and at the other end to the bellows connector 97. Bellows connector 97 is soldered to bellows 95 which in turn is soldered to collar 96a on thimble 96, making a hermetically sealed assembly.

Bellows 95 is made of material not subject to corrosion and with a relatively low coefficient of expansion as compared with the fluid 72 in the bulb. Provisions are made in this form also to reduce as far as possible the movement caused by the differential expansion between the fluid and the bellows. Connector 97 has an inwardly extending plunger 97a reciprocable in thimble 96. These two occupy the larger part of the interior of bellows 95 and as both are made of material with a low coefficient of expansion, and replace what would be a relatively large volume of the liquid with high coefficient of expansion, the difficulty referred to is reduced. In order to reduce the differential expansion further, I add a cylindrical extension 95a to the bellows, the end of this extension being the part that is soldered to the collar 96a. The thimble 96 leaves only a slight annular clearance in the collar. The ratio of volume of mercury to volume occupied by the material of low coefficient of expansion, i. e. thimble 96 and plunger 97a, is evidently made much smaller by this construction, and the objectionable effect on the thermostatic valve of temperature changes in the place where the valve is located correspondingly reduced or entirely removed.

It was stated above that the leading features of my invention would be pointed out later on. These will now be readily understood, and may be stated as follows.

In all prior controlling valve structures known to me and now in use or for which Letters Patent have been granted, the adjustment or readjustment of the temperature at which the thermostat becomes operative, is accomplished at the cost of disturbing the relative position of the dial or pointer with respect to the means for operating the thermostatic valve. This objectionable necessity is avoided by my construction.

The means for adjusting the temperature at which the thermostat becomes operative is independent of the manual means for controlling the fuel supply, and independent of the means for setting the thermostat to a predetermined temperature.

My device can be applied to the main fuel supply or manifold in a manner similar to the fuel supply valves for the open burners. Moreover the opening through the manifold cover can be of the same size and shape as those required for the valves controlling the fuel supply for the open burners.

In the liquid and bulb type particularly, the mechanism is such that it will not destroy itself when the oven is overheated or when the setting of the manual operating means is changed from high to low temperatures. In both of the forms of the liquid and bulb type novel provision is made for compensating for temperature variations affecting the plunger or bellows, located in the open burner section.

It will be noted that I completely house in the mechanism for adjusting the temperature at which the thermostat becomes active, as well as the mechanism for setting the thermostat to any desired temperature, and both of these mechanisms are kept completely out of contact with the fuel.

Other and perhaps minor advantageous features will have been noted in reading the above specification.

What I claim is:

1. A thermostatic fuel control comprising a casing, a valve in said casing, manual means to actuate said valve, a second valve in the casing, a thermostatic means to actuate the second valve, mechanism within the casing whereby the temperature at which the thermostatic means actuates its valve is determined by the setting of the manual means for actuating the first valve, said mechanism comprising a lever and a fulcrum plug for the lever, and means independent of the said mechanism to shift the position of the fulcrum plug.

2. Apparatus in accordance with claim 1, the last named means comprising a slidable member within which the fulcrum plug moves and means to adjust the position of the slidable member.

3. A thermostatic fuel control comprising a casing, a valve in said casing, manual means to operate said valve, a second valve in the casing, a thermostat, mechanism within the casing comprising a lever whereby the thermostat actuates the second valve, mechanism within said casing and comprising the same lever whereby the setting of the manual means determines the temperature at which the first named mechanism actuates the second valve, and means operable without disturbing the manual means to adjust the temperature at which the thermostat actuates the second valve.

4. A thermostatic fuel control comprising a casing, a valve in said casing, manual means to operate said valve, a second valve in the casing, a thermostat, mechanism within the casing comprising a lever whereby the thermostat actuates the second valve, mechanism within said casing and comprising the same lever whereby the setting of the manual means determines the temperature at which the first named mechanism actuates the second valve, visual means to indicate the temperature at which the manual means are set to have the thermostat actuate the second valve, and means operable without disturbing the manual means or the visual means to adjust the temperature at which the thermostat actuates the second valve.

5. In apparatus of the class described, a bulb, a cylinder, a capillary tube whose ends are sealed respectively to the bulb and the cylinder, and a cup-shaped imperforate closure resiliently engaging the wall of said cylinder with its open end toward the capillary tube, said cup before insertion into the cylinder being slightly tapered with the open end larger, the outer diameter at the open end being somewhat larger than the inner diameter of the cylinder.

6. Apparatus according to claim 5, the cylinder and cup-shaped closure being made of material having substantially the same coefficient of expansion.

7. Apparatus according to claim 5, the cylinder and cup-shaped closure being made of material having substantially the same coefficient of expansion, the apparatus further comprising a follower piece of material of small coefficient of expansion fitting loosely in the cup and occupying a relatively large portion of the space between the cylinder end and the closure.

8. Apparatus according to claim 5, and further comprising a second cup-shaped closure in the cylinder similar to the first, the bottoms of the two engaging each other.

9. Apparatus according to claim 5, and further comprising a second cup-shaped closure in the cylinder similar to the first, the bottoms of the two engaging each other, and a follower piece of material of substantially zero coefficient of expansion fitting loosely into the first cup and occupying a relatively large portion of the space between the cylinder end and the first cup, the cylinder and the two cup-shaped closures being made of material having substantially the same coefficient of expansion.

10. A thermostatic fuel control comprising a casing, a valve in said casing, manual means to operate said valve, a second valve in said casing, a thermostat, mechanism within the casing through which the thermostat actuates the second valve, mechanism within the casing and comprising one element of the first named mechanism whereby the position of the second valve is responsive to the setting of the manual means, and means independent of the manual means and acting on said one element to adjust the position of said second valve.

11. A thermostatic fuel control comprising a casing, a valve in said casing, manual means to operate said valve, a second valve in said casing, a thermostat, mechanism within the casing through which the thermostat actuates the second valve, mechanism within the casing and comprising one element of the first named mechanism whereby the position of the second valve is responsive to the setting of the manual means, and means independent of the manual means and acting on said one element and in screw-thread engagement with the casing and operable from the exterior of the casing to adjust the position of said second valve.

12. A thermostatic fuel control comprising a casing, a valve in said casing, manual means to operate said valve, a second valve in the casing, a thermostat, mechanism within the casing comprising a lever whereby the thermostat actuates the second valve, mechanism within said casing and comprising the same lever whereby the setting of the manual means determines the position of the second valve, and means in screw-thread engagement with the casing and operable from the exterior of the casing to alter the position of the fulcrum of the lever and thereby to adjust the position of the second valve.

13. A thermostatic fuel control comprising a casing, a valve in said casing, manual means to operate said valve, a second valve in the casing, a thermostat, mechanism within the casing comprising a lever whereby the thermostat actuates the second valve, mechanism within said casing and comprising the same lever whereby the setting of the manual means determines the position of the second valve, and means to hold the fulcrum of said lever in adjustable fixed position.

14. In apparatus of the class described, the combination of a casing a valve plug in said casing to control the flow of gas, manual means to actuate it, a second valve in the casing to regulate the rate of flow of the gas, thermostatically controlled means to actuate it, mechanism whereby the manual means also serve to selectively determine the position which the thermostatically controlled means gives to the second valve, and means extending through the wall of the casing and accessible from the exterior engaging the thermostatically controlled means to adjust the position given to the second valve by said thermostatically controlled means.

15. In apparatus of the class described, the combination of a casing, a valve plug in said casing to control the flow of gas, manual means to actuate it, a second valve in the casing to regulate the rate of flow of the gas, thermostatically controlled means to actuate it, mechanism whereby the manual means also serve to selectively determine the position which the thermostatically controlled means gives to the second valve, and an adjustment screw extending in screw-thread engagement through the wall of the casing and operable from the exterior engaging the thermostatically controlled means to adjust the position given to the valve by said thermostatically controlled means.

16. A thermostatic fuel control comprising a casing, a valve in said casing, manual means to actuate said valve, a second valve in the casing, thermostatic means to actuate the second valve, mechanism within the casing whereby the temperature at which the thermostatic means actuates its valve is determined by the setting of the manual means for actuating the first valve, and partitioning means within the casing preventing all access of fuel gas to said mechanism.

17. A thermostatic fuel control comprising a casing, a valve in said casing, manual means to actuate said valve, a second valve in the casing, thermostatic means to actuate the second valve, mechanism within the casing whereby the temperature at which the thermostatic means actuates its valve is determined by the setting of the manual means for actuating the first valve, the casing having a partition separating the second valve from said mechanism, and the means for actuating the second valve extending in leakproof relation through said partition.

18. In apparatus of the class described, comprising an oven with a gas burner and a pipe to supply gas to the burner, the combination of a casing to which gas is supplied and from which it flows to the pipe, a valve in the casing adapted to open the gas supply or to cut it off, a second valve in the casing to regulate the rate of gas flow, manual actuating means for the first valve, thermostatic actuating means for said second valve operative responsively to temperatures in the oven, mechanism for making the position of the second valve responsive to the setting of manual means actuating the first valve, means fixed in permanent relation to the said manual means to indicate visibly the oven temperature corresponding to any given setting of the manual means, and means independent of and separate from the manual actuating means and from the indicating means to adjust the thermostatic actuating means.

19. Apparatus in accordance with claim 18, the first valve being rotary and actuated by a rotary stem, the indicating means being fixed in said stem in such a manner that no rotational shifting between the two can occur.

20. Apparatus according to claim 5, and further comprising a second cup-shaped closure in the cylinder similar to the first, the bottoms of the two engaging each other, a plunger one portion of which fits closely into the cylinder and another portion of which fits loosely into the second closure, and resilient means urging the second closure with substantially constant force in a direction toward the capillary tube.

21. A thermostatic fuel control comprising a casing, a valve in said casing, manual means to operate said valve, a second valve in said casing, a thermostat, mechanism within the casing through which the thermostat actuates the second valve, mechanism within the casing and comprising one element of the first named mechanism to offset the position of the second valve by the setting of the manual means, and means independent of the manual means to adjust said second valve position.

22. In apparatus of the class described, and in combination, a bulb, a cylinder having one end closed, a piston in the cylinder comprising a cup-shaped piece with the hollow side toward the closed end of the cylinder and a filler piece having a low coefficient of expansion occupying the interior of the cup-shaped piece, a capillary tube connecting the bulb with the space between the piston and the closed end of the cylinder, a liquid filling the bulb, the capillary tube, and the said space, mechanism to be actuated, and means to transmit motion of the piston to the mechanism to actuate it.

23. In apparatus of the class described, a bulb located at the point where the temperature is to be regulated, an expansible chamber of the bellows form having the usual circumferentially extending corrugations for part of its length and having a plain cylindrical portion coaxial with the corrugated part, said expansible chamber being located at a point remote from that at which the temperature is to be regulated but at a point where temperature variations occur, a capillary tube connecting the two, a filler piece occupying a relatively very large proportion of the free space in the expansible chamber, and a liquid occupying the remaining space in the bulb, chamber, and tube, said filler piece having a coefficient of expansion such relatively to the coefficient of expansion of the walls of the expansible chamber and of the liquid that any change in the volume of the liquid in the chamber caused by a change in its temperature is substantially offset by a like volumetric change of the space left between the chamber walls and the filler piece, whereby temperature changes at the point where the expansible chamber is located do substantially not affect the operation of the apparatus.

24. Apparatus in accordance with claim 23, the filler piece comprising two telescoping portions, one carried by one end wall of the chamber and the other by the opposite end wall.

GEORGE J. DAY.